(12) United States Patent
Farajzadeh et al.

(10) Patent No.: US 9,334,717 B2
(45) Date of Patent: May 10, 2016

(54) ENHANCED OIL RECOVERY METHOD

(71) Applicant: SHELL OIL COMPANY, Houston, TX (US)

(72) Inventors: Rouhollah Farajzadeh, Rijswijk (NL); Hendrik Eikmans, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/297,148

(22) Filed: Jun. 5, 2014

(65) Prior Publication Data
US 2014/0360719 A1 Dec. 11, 2014

Related U.S. Application Data

(60) Provisional application No. 61/832,997, filed on Jun. 10, 2013.

(51) Int. Cl.
*E21B 43/20* (2006.01)
*C09K 8/58* (2006.01)

(52) U.S. Cl.
CPC .. *E21B 43/20* (2013.01); *C09K 8/58* (2013.01)

(58) Field of Classification Search
None
See application file for complete search history.

(56) References Cited

U.S. PATENT DOCUMENTS

| 2,859,818 | A | * | 11/1958 | Hall et al. | 166/269 |
|---|---|---|---|---|---|
| 3,074,481 | A | * | 1/1963 | Habermann | 166/245 |
| 3,131,759 | A | * | 5/1964 | Slusser | C09K 8/86 166/305.1 |
| 4,503,910 | A | | 3/1985 | Shu | |
| 4,889,186 | A | | 12/1989 | Hanson | |
| 5,267,615 | A | | 12/1993 | Christiansen et al. | |
| 5,377,756 | A | | 1/1995 | Northrop et al. | |
| 2012/0037363 | A1 | * | 2/2012 | Curole | 166/270 |
| 2013/0153228 | A1 | * | 6/2013 | Blom et al. | 166/303 |

* cited by examiner

*Primary Examiner* — Angela M DiTrani

(57) ABSTRACT

A method for producing oil from a fractured oil bearing formation is provided in which an oil recovery formulation comprising water and dimethyl ether is introduced into a fracture in the formation to mobilize oil, the mobilized oil is contacted with water or brine, and the mobilized oil is produced from the formation at a location positioned upwards from the fracture.

6 Claims, 4 Drawing Sheets

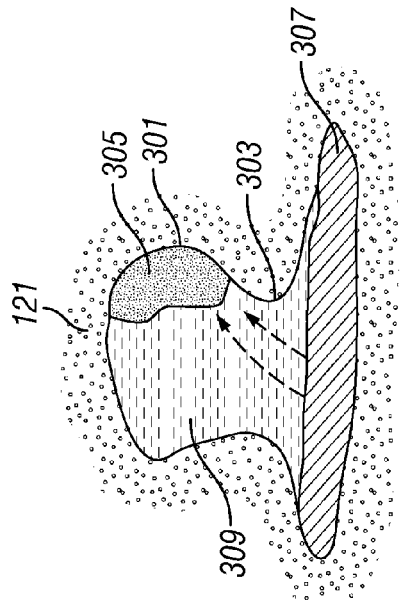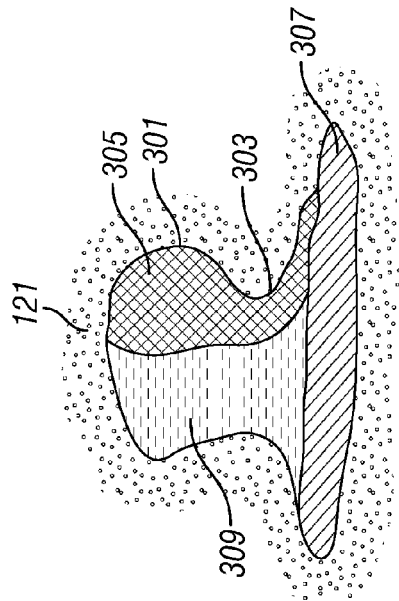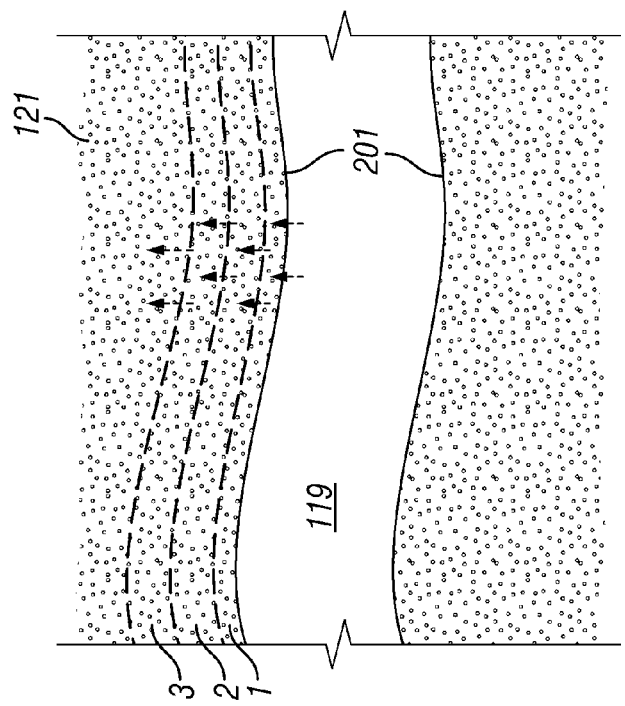

ENHANCED OIL RECOVERY METHOD

RELATED CASES

This application claims benefit of U.S. Provisional Application No. 61/832,997, filed on Jun. 10, 2013.

FIELD OF THE INVENTION

The present invention is directed to a method of recovering oil from an oil-bearing formation. In particular, the present invention is directed to a method of enhanced recovery of oil from an oil-bearing formation utilizing dimethyl ether.

BACKGROUND OF THE INVENTION

In the recovery of oil from a subterranean oil-bearing formation, it is possible to recover only a portion of the oil in the formation using primary recovery methods that utilize the natural formation pressure to produce the oil. A portion of the oil that cannot be produced from the formation using primary recovery methods may be produced by improved or enhanced oil recovery (EOR) methods.

Typically, further oil is produced from the formation after primary recovery by injecting water into the formation to mobilize oil for production from the formation. The injected water may drive a portion of the oil in the formation to a well for production from the formation. When a significant quantity of fractures extend through the formation, the injected water may preferentially flow through the fractures while leaving portions of the formation having lower fluid permeability untouched by the waterflood. As a result, a significant quantity of oil located in the portions of the formation having lower fluid permeability than the fractures may be left in the formation and not recovered by the waterflood.

Improvements to methods of recovering oil from an oil-bearing formation having a significant number of fractures extending therein are desirable.

SUMMARY OF THE INVENTION

The present invention is directed to a method for producing oil from a fractured oil-bearing formation, comprising: introducing an oil recovery formulation into a fracture within the formation, where the oil recovery formulation comprises water or brine and from 1 mol % to 18 mol % dimethyl ether, and where the fracture extends through a portion of the formation comprised of a porous matrix of rock, the porous matrix of rock containing oil therein; contacting the oil recovery formulation with the porous matrix of rock of the formation from the fracture to mobilize at least a portion of the oil therein; contacting the mobilized oil with water or brine; and producing the mobilized oil from a portion of the formation located upwards in the formation relative to the fracture into which the oil recovery formulation is introduced.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a schematic diagram of a fracture in a porous matrix of rock showing the action of an oil recovery formulation as utilized in accordance with the method of the present invention.

FIG. 3 is a schematic diagram of a pore within a porous matrix of rock showing the action of an oil recovery formulation as utilized in accordance with the method of the present invention.

FIG. 4 is a schematic diagram of a pore within a porous matrix of rock showing the action of an oil recovery formulation as utilized in accordance with the method of the present invention.

DETAILED DESCRIPTION OF THE INVENTION

Figure 1:
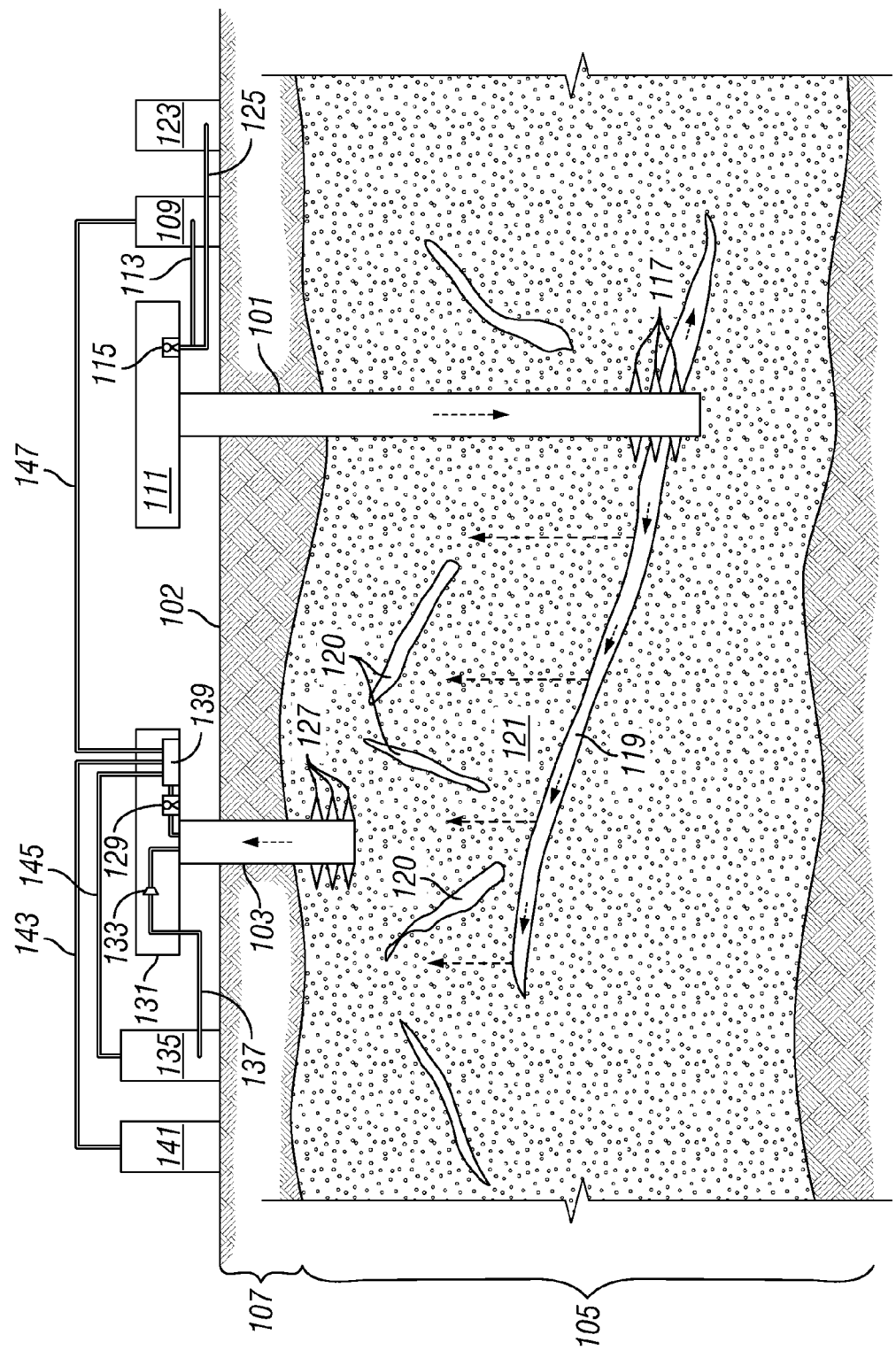
FIG. 1 is a schematic diagram of a system including an injecting well and a producing well that may be used to practice the method of the present invention.

The present invention is directed to a method of recovering oil from a fractured oil-bearing formation using an oil recovery formulation comprising water or brine and from 1 mol % to 18 mol % dimethyl ether (hereafter dimethyl ether may be referred to as DME). The oil recovery formulation is injected into a fracture in the formation. Unlike water, the oil recovery formulation may be imbibed into a portion of the formation formed of a porous matrix of rock through which the fracture extends due to the presence of dimethyl ether in the oil recovery formulation. The porous matrix of rock contains oil therein. Within the porous matrix of rock, dimethyl ether may mix with oil in the pores of the rock, swelling the oil and thereby releasing the oil from the pores to mobilize the oil. Water or brine is contacted with the mobilized oil, pushing the mobilized oil upwards through the formation since the mobilized oil is less dense than water. As the oil is mobilized and moved upwards through the porous rock matrix, DME may transfer from the mobilized oil through the water or brine to oil still trapped in pores of the porous rock matrix to mobilize further oil. The mobilized oil and the oil recovery formulation may traverse additional fractures in the formation as the mobilized oil and oil recovery formulation move upwards through the formation, where the DME may be imbibed from the additional fractures into the porous matrix of rock to mobilize still further oil from the porous matrix of rock. The mobilized oil may then be produced from the formation at a position in the formation located upwards of the fracture.

The oil recovery formulation used in the method of the present invention is comprised of water or brine and dimethyl ether. The dimethyl ether is present in the oil recovery formulation in an amount such that the dimethyl ether is soluble in a single phase in the water or brine at temperatures of from 0° C. to 50° C. The dimethyl ether may be present in the oil recovery formulation in an amount of from 1 mol % to 18 mol %, or from 2 mol % to 15 mol %. The oil recovery formulation may be comprised of fresh water having a total dissolved solids ("TDS") content of from 100 ppm to 5000 ppm, or from 500 ppm to 2000 ppm, or at most 1000 ppm or at most 500 ppm. Preferably the fresh water has a TDS content of at least 250 ppm TDS to avoid damaging the formation by swelling clays within the formation. Alternatively, the oil recovery formulation may be comprised of brine having a TDS content of at least 10000 ppm, or from 10000 ppm to 100000 ppm, or from 15000 ppm to 50000 ppm. Preferably the brine has a TDS content of at most 50000 ppm since DME is less soluble in high salinity brines than in fresh water or low salinity brines.

The oil recovery formulation may contain other components. The oil recovery formulation may contain one or more ethers other than DME that have from 2 to 6 carbon atoms selected from the group consisting of diethyl ether, methyl tertiary butyl ether, ethyl tertiary butyl ether, tertiary amyl methyl ether, methyl ethyl ether, dimethoxymethane, and polydimethoxymethane. The oil recovery formulation may contain from 0.1 mol % to 10 mol %, or from 1 mol % to 5 mol % of one or more ethers other than DME.

The oil-bearing formation may be a subterranean formation. The subterranean formation may be comprised of one or more portions comprised of a porous matrix of rock, where the porous matrix of rock may be located beneath an overburden, where the porous matrix of rock may be located at a depth ranging from 50 meters to 6000 meters, or from 100 meters to 4000 meters, or from 200 meters to 2000 meters under the earth's surface. The subterranean formation may be a subsea subterranean formation.

The porous matrix of rock may be a consolidated matrix material in which at least a majority, and preferably substantially all, of the rock that forms the matrix is consolidated such that the rock forms a mass in which substantially all of the rock is immobile when oil, the oil recovery formulation, water, or other fluid is passed therethrough. Preferably at least 95 wt. % or at least 97 wt. %, or at least 99 wt. % of the rock is immobile when oil, the oil recovery formulation, water, or other fluid is passed therethrough so that any amount of rock material dislodged by the passage of the oil, oil recovery formulation, water, or other fluid is insufficient to render the formation impermeable to the flow of the oil recovery formulation, oil, water, or other fluid through the formation. The porous matrix of rock may be an unconsolidated matrix material in which at least a majority, or substantially all, of the rock that forms the matrix material is unconsolidated. The formation may have a permeability of from 0.000001 to 15 Darcies, or from 0.001 to 1 Darcy. The rock of the formation may be comprised of sandstone, shale, and/or a carbonate selected from dolomite, limestone, and mixtures thereof—where the limestone may be microcrystalline or crystalline limestone and/or chalk.

Oil in the oil-bearing formation may be located in pores within the porous matrix of rock of the formation. The oil in the oil-bearing formation may be immobilized in the pores within the porous matrix of rock, for example, by capillary forces, by interaction of the oil with the pore surfaces, by the viscosity of the oil, or by interfacial tension between the oil and water in the formation. The pore surfaces of the porous rock matrix of the oil-bearing formation may be oil-wet or mixed oil/water wet, where the Amott-Harvey wettability index of the porous matrix of rock may be from −1.0 to 0.3.

The oil-bearing formation may also be comprised of water, which may be located in pores within the porous matrix of rock. The water in the formation may be connate water, water from an oil recovery process water-flood, or a mixture thereof. The water in the oil-bearing formation may be positioned to immobilize oil within the pores. Contact of the oil recovery formulation with the oil in the formation may mobilize the oil in the formation for production and recovery from the formation by freeing at least a portion of the oil from pores within the formation.

The formation further comprises one or more fractures extending through the porous matrix of rock. The porous matrix of rock has a lower fluid permeability than the fractures extending through the porous matrix of rock. The fractures may be naturally occurring within the formation, or the fractures may have been formed by conventional formation fracturing processes such as hydraulic fracturing. The porous matrix of rock of the formation may be traversed by a network of fractures extending therethrough.

Referring now to FIG. 1, a system for practicing the method of the present invention is shown. The system includes an injecting well 101 and a producing well 103 extending into an oil-bearing formation 105 such as described above, where the injecting portion of the injecting well is located deeper within the formation relative to the surface 102 than the producing portion of the producing well so that the producing portion of the producing well is located at a position upwards from the injecting portion of the injecting well, or more close to the surface, within the formation. The oil-bearing formation 105 may be located beneath an overburden 107. An oil recovery formulation as described above is provided. The oil recovery formulation may be provided from an oil recovery formulation storage facility 109 operatively fluidly coupled to an injection facility 111 via conduit 113. The injection facility 111 may be operatively fluidly coupled to the injecting well 101, which may be located extending from the injection facility 111 into the oil-bearing formation 105. The oil recovery formulation may flow from the injection facility 111 through the injecting well 101 to be introduced into the formation 105, where the injection facility and the injecting well, or the injecting well itself, include(s) a mechanism for introducing the oil recovery formulation into the formation. Alternatively, the oil recovery formulation may flow from the oil recovery formulation storage facility 109 directly to the injecting well 101 for injection into the formation 105, where the injecting well comprises a mechanism for introducing the oil recovery formulation into the formation. The mechanism for introducing the oil recovery formulation into the formation 105 via the injecting well 101—located in the injection facility 111, the injecting well, or both—may be comprised of a pump 115 for delivering the oil recovery formulation to perforations or openings 117 in the injecting well through which the oil recovery formulation may be introduced into the formation.

The oil recovery formulation may be introduced into the formation 105, for example by injecting the oil recovery formulation into the formation through the injecting well 101 by pumping the oil recovery formulation through the injecting well and into the formation. The oil recovery formulation is introduced into the formation by introducing the oil recovery formation into a fracture 119 within the formation, for example by injecting the oil recovery formulation through perforations or openings 117 in the injecting well 101 into the fracture 119. The pressure at which the oil recovery formulation may be injected into the fracture 119 through the injecting well 101 may be from greater than the instantaneous formation pressure within the fracture 119 up to a pressure for further fracturing the formation, as may be determined by one of ordinary skill in the art. The pressure at which the oil recovery formulation may be injected into the fracture may be greater than the instantaneous pressure within the formation 105 in the porous matrix of rock 121 about the fracture 119 within the formation.

The volume of oil recovery formulation introduced into the formation 105 via the injecting well 101 may range from 0.001 to 5 pore volumes, or from 0.01 to 2 pore volumes, or from 0.1 to 1 pore volumes, or from 0.2 to 0.6 pore volumes, where the term "pore volume" refers to the volume of the formation that may be swept by the oil recovery formulation between the injecting well 101 and the producing well 103. The pore volume may be readily be determined by methods known to a person skilled in the art, for example by modelling studies or by injecting a solvent less dense than oil and water having a tracer contained therein into the fracture 119 and through the formation 105 from the injecting well 101 to the producing well 103.

As the oil recovery formulation is introduced into the formation 105 through the fracture 119, the oil recovery formulation flows through the formation along the fracture, contacting the walls of the fracture as it flows through the fracture. Referring now to FIG. 2, a portion of the oil recovery formulation contacting the walls 201 of the fracture may be spontaneously imbibed into the porous matrix of rock due to the DME in the oil recovery formulation. The oil recovery formulation may enter the porous matrix of rock 121 immediately adjacent to the walls 201 of the fracture, shown as zone 1 in FIG. 2. DME is soluble in water and in oil, and as shown in FIGS. 3 and 4, the DME in the oil recovery formulation may transfer from the oil recovery formulation 307 into oil 305 located in pores 301 in the porous matrix of rock 121 through water 309 at the pore neck 303. The DME may swell the oil, reduce the viscosity of the oil, reduce the wettability of the oil on the pore surfaces, and/or reduce the capillary forces retaining the oil in the pores so that at least a portion of the oil escapes the pores 301, and is mobilized for movement through the porous matrix of rock. Referring back to FIG. 2, further oil recovery formulation may be imbibed by the porous matrix of rock at the walls of the fracture, pushing the mixture of DME and mobilized oil already in the formation upwards from the fracture since the mixture is less dense than water and oil in the porous rock matrix, shown as moving the mixture from zone 1 to zone 2 in the porous matrix of rock in FIG. 2. The mobilized mixture of the oil recovery formulation and oil may be pushed upwards through the formation by further introduction of more oil recovery formulation into the fracture 119 in the formation. As the oil recovery formulation is pushed upwards through the porous matrix of rock of the formation, DME may transfer from the mobilized oil through water in the formation to contact more oil within pores in the formation to mix with and mobilize further oil from the porous matrix of rock.

Referring back to FIG. 1, after the oil recovery formulation has been introduced into the formation, the mobilized oil is contacted with water or brine to push the mobilized oil upwards through the porous matrix of rock in the formation 105 for production from the producing well 103. Water or brine may be introduced into the fracture 119 of the formation to contact the mobilized oil with water or brine. The water or brine may be provided from a water storage facility 123 operatively fluidly coupled to the injection facility 111 or the injecting well 101 via conduit 125. The water or brine may flow from the injection facility 111 through the injecting well 101 to be introduced into the formation 105, where the injection facility and the injecting well, or the injecting well itself, include(s) a mechanism for introducing the water or brine into the formation. Alternatively, the water or brine may flow from the water storage facility 123 directly to the injecting well 101 for injection into the formation 105, where the injecting well comprises a mechanism for introducing the water or brine into the formation. The mechanism for introducing the water or brine into the formation 105 via the injecting well 101— located in the injection facility 111, the injecting well 101, or both—may be the same pump 115 utilized for delivering the oil recovery formulation to perforations or openings 117 in the injecting well.

Referring again to FIG. 2, the water or brine injected into the fracture 119 may contact the mobilized oil and the oil recovery formulation and push the mobilized oil and the DME of the oil recovery formulation upwards for recovery by the producing well. The mobilized oil and DME may be pushed upwards away from the fracture 119 by the water or brine introduced into the fracture since the water or brine is more dense than the mobilized oil and DME, shown in FIG. 2 as moving the mobilized oil or mixture of mobilized oil and DME from zone 2 to zone 3 and from zone 3 upwards into the porous matrix of rock of the formation.

Figure 5:
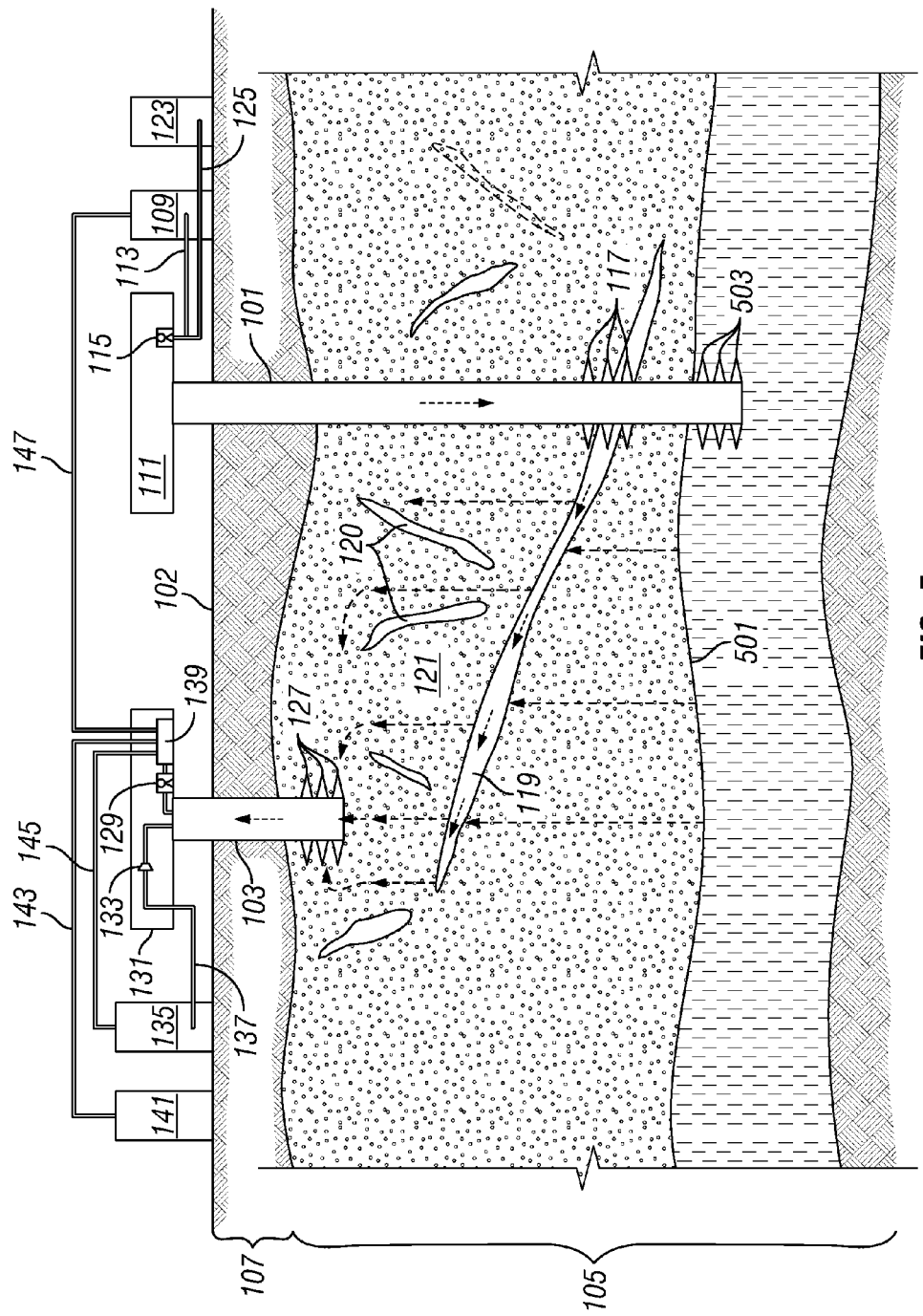
FIG. 5 is a schematic diagram of a system including an injecting well and a producing well that may be used to practice the method of the present invention.

Alternatively, as shown in FIG. 5, the water or brine may be introduced into the formation at or below an oil-water interface 501 within the formation to increase the volume of water in the formation and raise the oil-water interface within the formation. Water or brine may be provided from a water storage facility 123 to the injection facility 111 or the injecting well 101 for injection into the formation at or below the oil-water interface 501 through perforations or openings 503 in the first well located at or below the oil-water interface. The rising oil-water interface may contact the mobilized oil and the DME of the oil recovery formulatin and push the mobilized oil and DME upwards within the formation for production from the producing well 103.

Referring to FIGS. 1 and 5, the water or brine introduced into the formation 105 following introduction of the oil recovery formulation into the fracture 119 within the formation 105 or at or below an oil-water interface 501 within the formation may be fresh water or brine. Fresh water introduced into the formation 105 following introduction of the oil recovery formulation may have a total dissolved solids ("TDS") content of from 100 ppm to 5000 ppm, or from 500 ppm to 2000 ppm, or at most 1000 ppm or at most 500 ppm. Alternatively, the oil recovery formulation may be comprised of brine having a TDS content of at least 10000 ppm, or from 10000 ppm to 250000 ppm, or from 35000 ppm to 150000 ppm. Most preferably the brine has a TDS content of at least 50000 ppm since DME is less soluble in high salinity brines, and the high salinity brine will push the DME upwards in the formation to mobilize more oil rather than dilute the DME in the water within the formation.

The volume of water or brine introduced into the formation 105 following introduction of the oil recovery formulation into the fracture 119 within the formation should be sufficient to produce substantially all of the accessible mobilized oil from the formation. Water or brine may be injected into the formation until production of oil from the producing well has ceased, or has decreased to an insubstantial amount.

As noted above, the water or brine pushes the mobilized oil and the DME of the oil recovery formulation upwards through the formation due the density difference between the water or brine and the mobilized oil and DME. The formation 105 may contain multiple fractures 120 extending through the porous matrix of rock 121 between the injecting well 101 and the producing well 103. The DME pushed upwards through the formation 105 by the water or brine may enter at least a portion of the fractures 120 and be imbibed into the porous matrix of rock adjacent to the fractures 120 as described above to mobilize further oil from the portion of the porous matrix of rock adjacent to the fractures. This mobilized oil and the DME may be pushed further upwards in the formation by the water or brine.

Referring still to FIGS. 1 and 5, oil may be recovered from the formation 105 through the producing well 103 after introduction of the oil recovery formulation into the fracture within the formation and subsequently contacting the oil mobilized by the oil recovery formulation with the water or brine. As noted above, the producing section of the producing well 103 is located at a position located upwards in the formation 105 relative to the fracture 119 into which the oil recovery formulation is introduced. The producing section of the producing well 103 may include perforations or openings 127 through which the mobilized oil may be recovered. A pump 129 located in a production facility 131 or within the producing well 103 may draw oil from the formation 105 through the perforations or openings 127 in the producing well to deliver the produced oil to the production facility. Alternatively, a compressor 133 located in the production facility 131 may compress a gas for injection into the formation 105, where the gas may be compressed to a pressure sufficient to drive the production of oil from the formation, where the appropriate pressure may be determined by conventional methods known to those skilled in the art. The compressor 133 may be fluidly operatively coupled to a gas storage tank 135 via conduit 137, and may compress gas from the gas storage tank for injection into the formation 105 through the producing well 103. The compressed gas may be injected into the formation from a different position on the producing well 103 than the well position at which the oil is produced from the formation.

Oil, optionally in a mixture with the oil recovery formulation, water, and/or gas may be drawn from the formation 105 and produced up the producing well 103 to the production facility 131. The oil produced through the producing well 103 may be separated from the oil recovery formulation, gas, and/or water in a separation unit 139 located in the production facility 131. The separation unit 139 may be comprised of a conventional liquid-gas separator for separating gas from the oil, at least a portion of the oil recovery formulation, and water; a conventional hydrocarbon-water separator for separating the oil and at least a portion of the oil recovery formulation from water; and a conventional distillation or flash column for separating at least a portion of the DME from the oil or from the oil and water.

The separated produced oil may be provided from the separation unit 139 of the production facility 131 to an oil storage tank 141, which may be fluidly operatively coupled to the separation unit 139 of the production facility by conduit 143. The separated gas, if any, may be provided from the separation unit 139 of the production facility 131 to the gas storage tank 135, which may be operatively fluidly coupled to the separation unit of the production facility by conduit 145. The produced and separated DME may be provided from the separation unit 139 of the production facility 131 to the oil recovery formulation storage facility 109 by conduit 147. Prior to adding the produced and separated DME to the oil recovery formulation storage facility 109, water or brine may be added to the produced and separated DME to provide a selected concentration of DME in water in accordance with concentration of DME in the oil recovery formulation.

Figure 6:
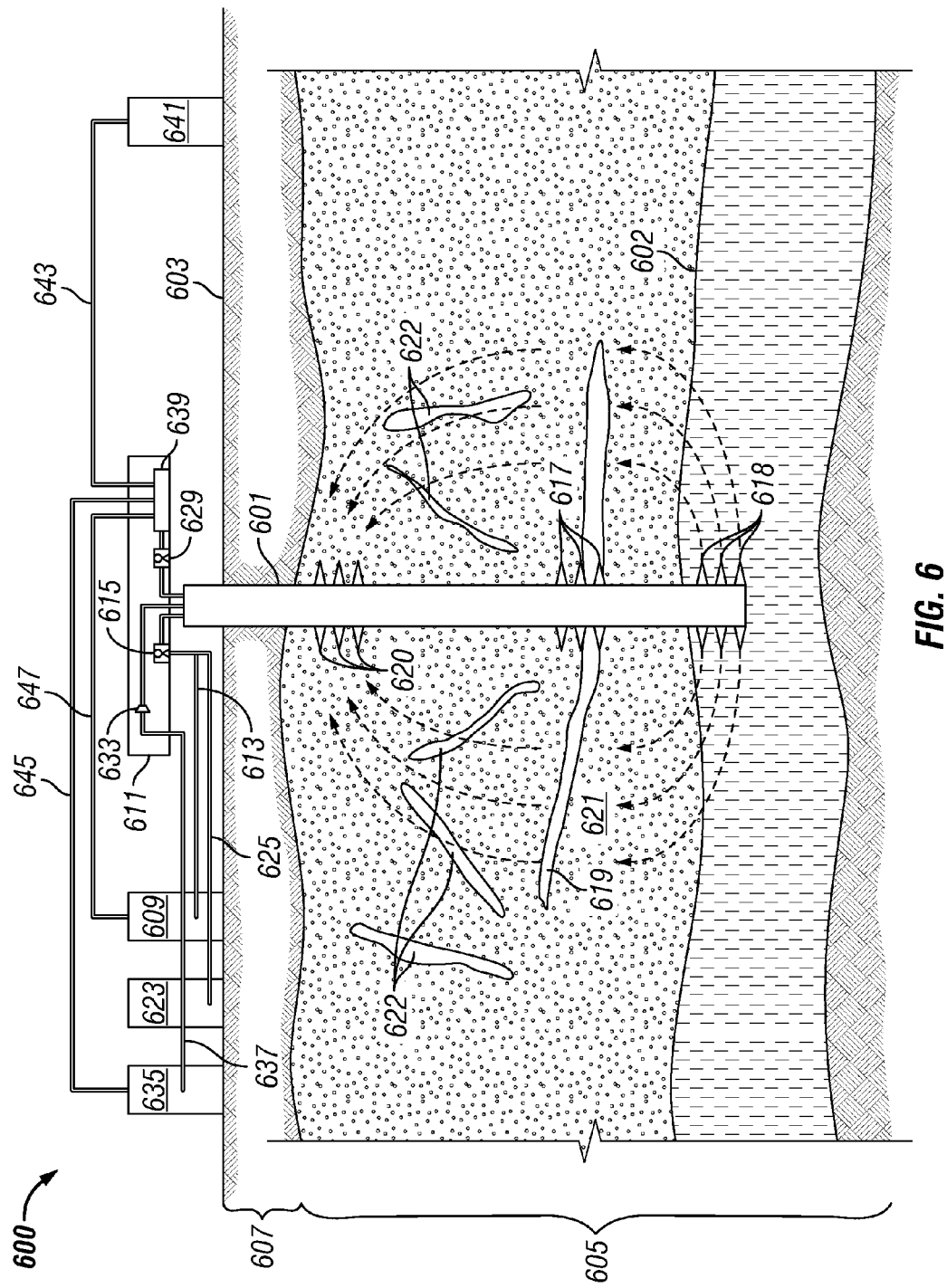
FIG. 6 is a schematic diagram of a system including a well for injecting and producing that may be used to practice the method of the present invention.

Referring now to FIG. 6, a system 600 for practicing the method of the present invention utilizing a single well to inject the oil recovery formulation into an oil-bearing formation and to produce oil from the formation. The system includes a well 601 extending into an oil-bearing formation 605 such as described above, where the injecting portion of the well is located at a greater depth from the surface 603 than the producing portion of the well. The oil-bearing formation 605 may be located beneath an overburden 607, and may include an oil-water interface 602 below which the formation is substantially water saturated.

An oil recovery formulation as described above is provided. The oil recovery formulation may be provided from an oil recovery formulation storage facility 609 fluidly operatively coupled to an injection/production facility 611 via conduit 613. The injection/production facility 611 may be fluidly operatively coupled to the well 601, which may be located extending from the injection/production facility 611 into the oil-bearing formation 605. The oil recovery formulation may flow from the injection/production facility 611 through the well 601 to be introduced into the formation 605, where the injection/production facility and the well, or the well itself, include(s) a mechanism for introducing the oil recovery formulation into the formation. Alternatively, the oil recovery formulation may flow from the oil recovery formulation storage facility 609 directly to the well 601 for injection into the formation 605, where the well comprises a mechanism for introducing the oil recovery formulation into the formation. The mechanism for introducing the oil recovery formulation into the formation 605 via the well 601—located in the injection/production facility 611, the well 601, or both—may be comprised of a pump 615 for delivering the oil recovery formulation to perforations or openings 617 in the well through which the oil recovery formulation may be introduced into the formation.

The oil recovery formulation may be introduced into the formation 605, for example by injecting the oil recovery formulation into the formation through the well 601 by pumping the oil recovery formulation through the well and into the formation. The oil recovery formulation is introduced into the formation by introducing the oil recovery formation into a fracture 619 within the formation, for example by injecting the oil recovery formulation through perforations or openings 617 in the well 601 into the fracture 619. The pressure at which the oil recovery formulation may be injected into the fracture 619 through the well 601 may be from greater than the instantaneous formation pressure within the fracture 619 up to a pressure for further fracturing the formation, as may be determined by one of ordinary skill in the art. The pressure at which the oil recovery formulation may be injected into the fracture may be greater than the instantaneous pressure within the formation 605 in a porous matrix of rock 621 about the fracture 619 within the formation.

The volume of oil recovery formulation introduced into the formation via the well 601 may be selected based on the radius of likely oil recovery around the well. The volume of oil recovery formulation may be selected to saturate a height of the formation of at least 0.1 meters, or at least 0.5 meters, or at least 1 meter, or at least 2 meters of the formation radially around the well a radial distance of at least 1 meter, or at least a radial distance of 3 meters, or at least a radial distance of 5 meters, or at least a radial distance of 10 meters, or at least a radial distance of 20 meters.

As described above with respect to the system comprising an injecting well and a producing well, as the oil recovery formulation is introduced into the formation 605 through the fracture 619, the oil recovery formulation contacts the walls of the fracture and is spontaneously imbibed into the porous matrix of rock 621 immediately adjacent to the walls of the fracture. The oil recovery formulation mobilizes oil in the porous matrix of rock 621 upon contact with the porous matrix of rock. The mobilized oil may be displaced upwards in the formation by the injection of further oil recovery formulation into the fracture 619 or by injection of water or brine into the formation as described below. The upwardly displaced oil recovery formulation may mobilize further oil in the porous matrix of rock as it moves upwards through the formation.

After the oil recovery formulation has been introduced into the formation 605, the mobilized oil is contacted with water or brine to push the mobilized oil upwards through the porous matrix of rock 621 in the formation for production from the producing section of the well. The producing section of the well may comprise perforations or openings 620 located in a position on the well closer to the surface 603 than the perforations or openings 617 for injecting the oil recovery formulation into the formation.

Water or brine may be introduced into the formation to contact the mobilized oil with water or brine. The water or brine may have a TDS content as described above with respect to water or brine contacted with mobilized oil after introduction of an oil recovery formulation into a formation in the system including an injecting well and a producing well. The water or brine may be provided from a water storage facility 623 operatively fluidly coupled to the injection/production facility 611 or the well 601 via conduit 625. The water or brine may flow from the injection/production facility 611 through the well 601 to be introduced into the formation 605, where the injection/production facility and the well, or the well itself, include(s) a mechanism for introducing the water or brine into the formation. Alternatively, the water or brine may flow from the water storage facility 623 directly to the well 601 for injection into the formation 605, where the well comprises a mechanism for introducing the water or brine into the formation. The mechanism for introducing the water or brine into the formation 605 via the well 601—located in the injection/production facility 611, the well 601, or both— may be the same pump 615 utilized for delivering the oil recovery formulation to the perforations or openings 617 in the well for injecting the oil recovery formulation into the formation.

The water or brine may be introduced into the formation 605 into the fracture 619 in the formation. Water or brine may be injected into the fracture through the perforations or openings 617 in the well 601. Alternatively, the water or brine may be introduced into the formation at or below the oil-water interface 602 within the formation to increase the volume of water in the formation and raise the oil-water interface within the formation. Water or brine may be injected into the formation at or below the oil-water interface 602 through perforations or openings 618 in the well 601 located at or below the oil-water interface. The rising oil-water interface may contact the mobilized oil and push the mobilized oil upwards within the formation for production through perforations or openings 620 in the well.

The volume of water or brine introduced into the formation 605 following introduction of the oil recovery formulation into the fracture 619 within the formation should be sufficient to produce substantially all of the accessible mobilized oil from the formation. Water or brine may be injected into the formation until production of oil from the producing well has ceased, or has decreased to an insubstantial amount.

As noted above, the water or brine pushes the mobilized oil and the DME of the oil recovery formulation upwards through the formation due the density difference between the water or brine and the mobilized oil and DME. The formation 605 may contain multiple fractures 622 extending through the porous matrix of rock 621 between the perforations or openings 617 in the well 601 for introducing the oil recovery formulation into the fracture 619 and perforations or openings 620 in the well for producing the mobilized oil from the formation. The DME pushed upwards through the formation 605 by the water or brine may enter at least a portion of the fractures 622 and be imbibed into the porous matrix of rock adjacent to the fractures 622 as described above to mobilize further oil from the portion of the porous matrix of rock adjacent to the fractures. This mobilized oil and the DME may be pushed further upwards in the formation by the water or brine.

Oil may be recovered from the formation 605 through the perforations or openings 620 in the producing section of the well 601 after introduction of the oil recovery formulation into the fracture within the formation and subsequently contacting the oil mobilized by the oil recovery formulation with the water or brine. As noted above, the producing section of the well 601 is located at a position located upwards in the formation 605 relative to the fracture 619 into which the oil recovery formulation is introduced. A pump 629 located in the injection/production facility 611 or within the well 601 may draw oil from the formation 605 through the perforations or openings 620 in the well to deliver the produced oil to the injection/production facility. Alternatively, a compressor 633 located in the injection/production facility 611 may compress a gas for injection into the formation 605, where the gas may be compressed to a pressure sufficient to drive the production of oil from the formation, where the appropriate pressure may be determined by conventional methods known to those skilled in the art. The compressor 633 may be fluidly operatively coupled to a gas storage tank 635 via conduit 637, and may compress gas from the gas storage tank for injection into the formation 605 through the well 601. The compressed gas may be injected into the formation from a different position on the well 601 than the well position at which the oil is produced from the formation.

Oil, optionally in a mixture with the oil recovery formulation, water, and/or gas may be drawn from the formation 605 and produced up the well 601 to the injection/production facility 611. The oil produced through the well 601 may be separated from the oil recovery formulation, gas, and/or water in a separation unit 639 located in the injection/production facility 611. The separation unit 639 may be comprised of a conventional liquid-gas separator for separating gas from the oil, at least a portion of the oil recovery formulation, and water; a conventional hydrocarbon-water separator for separating the oil and at least a portion of the oil recovery formulation from water; and a conventional distillation or flash column for separating at least a portion of the DME from the oil or from the oil and water.

The separated produced oil may be provided from the separation unit 639 of the injection/production facility 611 to an oil storage tank 641, which may be operatively fluidly coupled to the separation unit 639 of the injection/production facility by conduit 643. The separated gas, if any, may be provided from the separation unit 639 of the injection/production facility 611 to the gas storage tank 635, which may be operatively fluidly coupled to the separation unit of the injection/production facility by conduit 645. The produced and separated DME may be provided from the separation unit 639 of the injection/production facility 611 to the oil recovery formulation storage facility 609 by conduit 647. Prior to adding the produced and separated DME to the oil recovery formulation storage facility 609, water or brine may be added to the produced and separated DME to provide a selected concentration of DME in water in accordance with concentration of DME in the oil recovery formulation.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While systems and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed:

1. A method for producing oil from a fractured oil-bearing formation containing an oil-water interface, comprising:
    introducing an oil recovery formulation into a fracture within the formation, where the oil recovery formulation comprises water and from 1 mol % to 18 mol % dimethyl ether wherein the dimethyl ether is present in the oil recovery formulation in an amount such that the dimethyl ether is soluble in a single phase in water or brine at temperatures of from 0° C. to 50° C., and where the fracture extends through a portion of the formation comprised of a porous matrix of rock, the porous matrix of rock having a lower fluid permeability than the fracture, and the porous matrix of rock containing oil therein;
    contacting the oil recovery formulation with the porous matrix of rock of the formation from the fracture to mobilize at least a portion of the oil therein;
    introducing water or brine into the formation at or below the oil-water interface thereby raising the oil-water interface within the formation and contacting the mobilized oil with the water or brine; and
    producing the mobilized oil from the formation at a position located upwards in the formation relative to the fracture into which the oil recovery formulation is introduced.

2. The method of claim 1 wherein the mobilized oil is contacted with brine having a total dissolved solids content of greater than 50,000 ppm.

3. The method of claim 1 wherein the oil-bearing formation has been waterflooded prior to introducing the oil recovery formulation into the formation.

4. The method of claim 1 wherein contacting the oil recovery formulation with the porous matrix of rock of the formation decreases the oil-wetness of rock surfaces within the formation and increases the water-wetness of the rock surfaces.

5. The method of claim 1 wherein the water or brine contacted with the mobilized oil is introduced into the formation at a location in the formation at or below the mobilized oil.

6. The method of claim 5 wherein the water or brine contacted with the mobilized oil is introduced into the formation at or below the oil-water interface below which the formation is saturated with water or brine.

* * * * *